Nov. 28, 1961 A. LARSEN 3,010,735
ATTACHMENT MEANS FOR COUPLING A TOWED IMPLEMENT
OR VEHICLE TO A TRACTOR
Filed April 27, 1959 2 Sheets-Sheet 2
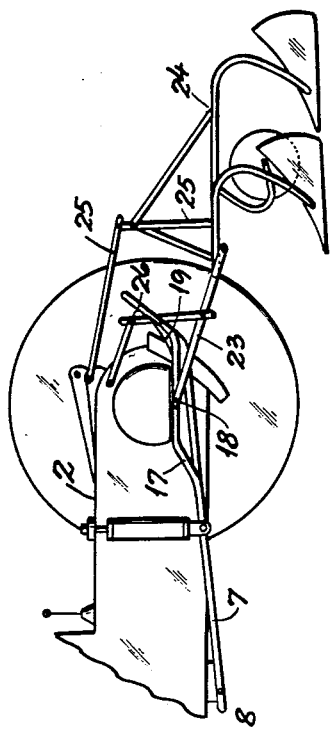
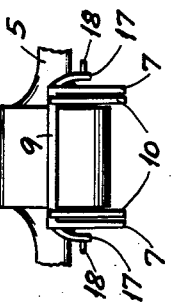
ADOLF LARSEN
INVENTOR
BY Wenderoth, Lind & Ponack
ATTORNEYS

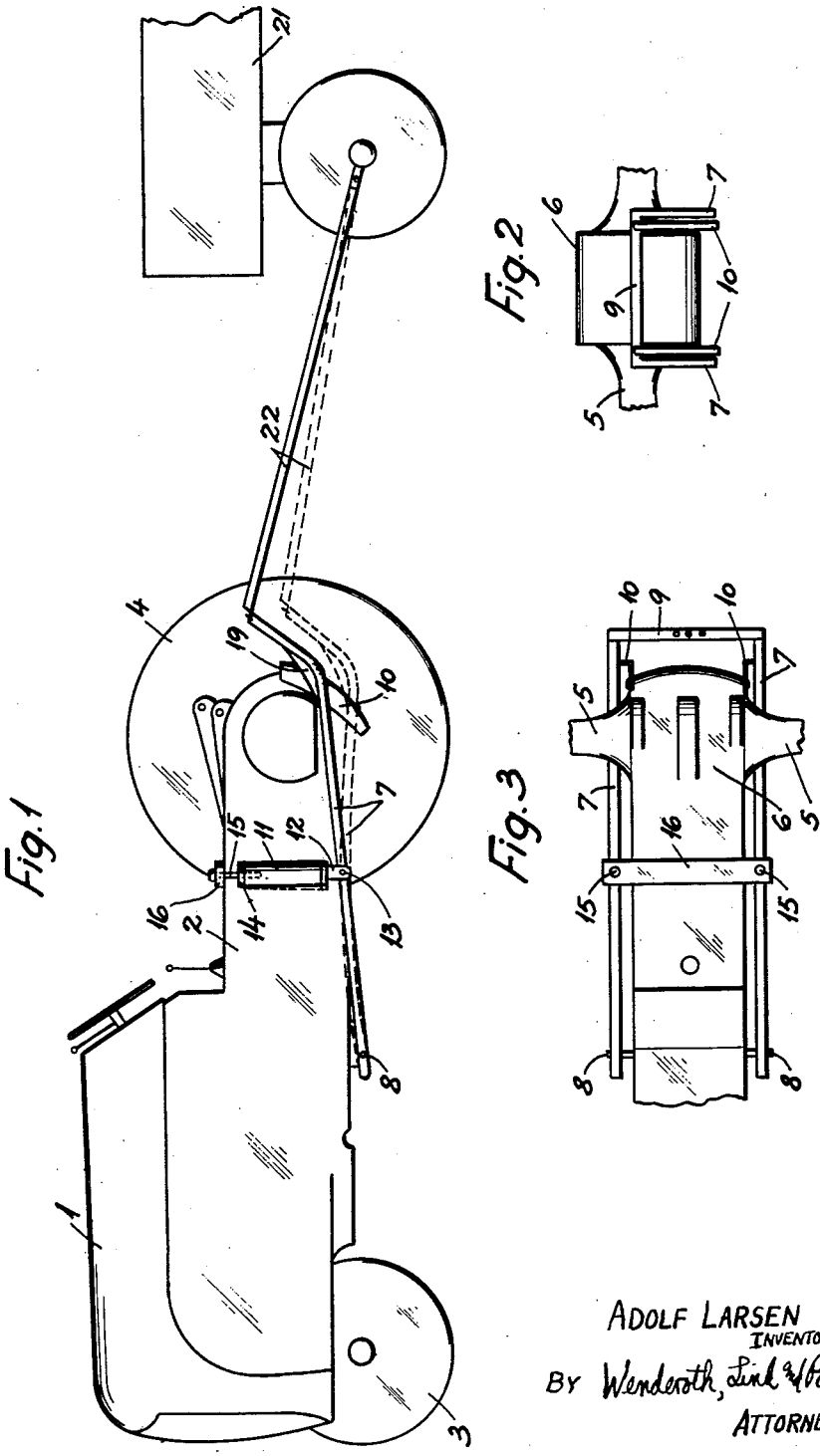

United States Patent Office 3,010,735
Patented Nov. 28, 1961

3,010,735
ATTACHMENT MEANS FOR COUPLING A TOWED IMPLEMENT OR VEHICLE TO A TRACTOR
Adolf Larsen, Nykobing Falster, Denmark
Filed Apr. 27, 1959, Ser. No. 808,969
Claims priority, application Denmark May 17, 1958
2 Claims. (Cl. 280—405)

The present invention relates to a trailer hitch for detachably connecting a tractor to a trailer or agricultural implement. The object of the invention is to provide a device which will automatically permit an optimum towing force to be exerted with regard to the condition of the soil or ground and which at the same time will avoid any danger of the tractor rearing up or turning over backwards.

To obtain maximum towing force it is important that the load on the rear driving wheels of the tractor be considerable.

For that purpose it is advantageous that the coupling or hook member of the hitch to which the towed vehicle is coupled be positioned at a relatively high level above the rear axle of the tractor, which will cause an increase of the rear axle load depending on the magnitude of the towing force.

However, this position of the hook member will result in the towing force producing a backward tilting moment of the tractor and possibly turn it over. To avoid this danger the hook member has been placed at a level lower than the rear axle, but the advantage of the increasing of the rear axle load due to the towing power is thereby lost. On the contrary this load will decrease.

It has been suggested to place the hook member so that it is resiliently lowered by the action of the towing force or resistance exerted on the hook member, but with the known devices the arrangement is such that either the hook member is situated rather far below the level of said rear axle in any of its possible positions during towing, or it is situated above that axle. These known devices cannot give the optimal towing conditions under different soil and towing resistance circumstances.

The hitch according to the present invention is a simple and sturdy device which combines the advantage of an increase, under certain towing conditions, of the load on the rear axle of the tractor with security against rearing up or turning over of the tractor under all conditions. This advantage and other advantageous traits of the invention will be more clearly described with reference to the accompanying drawings, in which FIG. 1 is a side elevation view of a tractor with the draw beam thereon and a trailer being towed thereby, the near rear wheel of the tractor being moved to show the parts behind it;

FIG. 2 is a rear elevation view of the draw beam and a portion of the rear axle of the tractor;

FIG. 3 is a plan view of the draw beam and a portion of the tractor;

FIG. 4 is a side elevation view of a portion of a tractor with a modified draw beam for a plough; and FIG. 5 is a rear elevation view of the draw beam as shown in FIG. 4.

In the drawings 1 indicates a tractor, 2 its body, 3 its steerable front wheel and 4 its driving rear wheel with back axle casing 5 and differential casing 6. Reference numeral 21 indicates part of a trailer which is coupled to the tractor by rod 22.

On the tractor there is mounted a draw beam mounting, consisting of two traction arms 7 mounted on either side of the tractor body 2, and which at their front ends are pivotally attached to the body by means of horizontal pins 8 located on the underside of the tractor body and extending out to the side, while at the rear ends thereof the arms are mutually connected by a detachable transverse draw beam 9 which is provided with holes or other hook means for coupling the coupling rod 22 for the trailer.

The traction arms 7 are elastically flexible in the vertical direction but at their bent position are each stiffened by a reinforcement 19. On both sides of the differential casing 6 is rigidly mounted a guide plate 10 for guiding the sides of the traction arms during their movement up and down.

In the embodiment shown in FIGS. 1–3, each of the traction arms 7 is supported by a strap member 11 at an intermediate point 13. The lower end of the strap member 11 is attached to the arm by a swivel fitting 12, which at its upper end is provided with a nut 14 by means of which the strap member is adjustably fastened to a threaded spindle 15 on which the nut member is threaded. The spindle 15 extends through a smooth bore hole in a transverse bar 16 fixed transversely across the tractor body, and against which the head of the spindle 15 abuts.

By pulling the strap member 11 up towards the transverse bar 16 by turning the spindle 15 in the nut member 14, the initial position of the traction arms may be adjusted so as to hold the rear ends thereof with the transverse draw beam and the hook means above the level of the tractor's rear axle when no traction force is exerted on the coupling rod 22, this position being shown in full lines in FIG. 1. It is noted that in this initial position of the device an extension of the axis of coupling rod 22 will pass above the rear axle of the tractor.

When the tractor is moving and a traction force is transmitted from the coupling rod 22 to the draw beam 9, because of the resistance of the trailer being towed, the draw beam and the rear end of the traction arms will be lowered and these arms be elastically bent, as shown in dotted lines in FIG. 1, thereby offering a spring resistance to the lowering movement, which resistance increases with the distance through which the arms move, and which depends on the magnitude of the traction force transmitted by the coupling rod 22. The extension of the axis of this rod then will pass nearer to the tractor's rear axle, and eventually pass below this axle, which is essential for the intended effect of the invention.

The traction arms may be pre-stressed by tightening up the strap member 11 by means of spindle 15 and nut member 14, so as to hold the rear ends of the traction arms at their initial levels until the traction force in rod 22 has reached a certain magnitude.

In FIGS. 4 and 5 there is shown one way of arranging longitudinal traction beams for the mounting of traction shafts 23 for a plough 24. On the outer side of each traction arm there is welded a longitudinal traction beam 17 of the shape shown. Each beam 17 has at a point opposite the ends of the back axle a laterally projecting pin 18, which serves for the pivotal mounting of the traction shafts 23 for the plough on these pins so that the traction shafts can swing up and down. There is also shown the parallelogram framework 25 for lifting the plough, and the tractor's hydraulic lift 26, in which the traction shaft 23 of the plough is pivoted near its center. An increase of the resistance of the plough moving through the earth will also in this case cause a downwards movement of the traction arm 7, whereby there is obtained a resilient pull, which especially in the case of sudden jerky resistance increases is advantageous, and at the same time the back wheel loading is increased and to increase the tractor's tractive capacity, since the resultant of the vertical pull that the plough exerts during its work in the ground, and the horizontal tractive resistance is exerted on a line passing above the tractor's back axle.

When in the foregoing there has been mention of a trailer or a plough, it must be understood that this covers every type of vehicle or towed implement, which is coupled to or in some other way mounted on the attachment means.

The attachment means in accordance with the invention can be carried out in many other ways than that shown and described and still come within the scope of the invention. Thus traction bars shown may, in place of being pivoted on a pin, be firmly attached at their front end, so that the movement up and down takes place solely due to their bending.

What I claim is:

1. A trailer hitch for detachably connecting a tractor having a rear axle with a trailer or an agricultural implement, comprising two traction arms disposed longitudinally of said tractor having their front portions attached to said tractor and extending rearwardly of said tractor past the rear axle, the rear portions of said arms being bent upwardly, a transverse member connecting the rear ends of said arms, hook means on said transverse member, each of said arms being elastically deformable in the vertical direction transverse to their length and fixedly mounted on said tractor in such manner as to hold them in a position with the hook means on said transverse member above the level of said rear axle when no outer downward force is exerted on said rear ends, the elastic deformability of said arms permitting a lowering of said rear ends when a downward force is exerted against them to a position with said hook means below the level of said rear axle, the distance of said lowering depending on the magnitude of said downward force.

2. A trailer hitch as set forth in claim 1, in which said traction arms each have a longitudinally extending beam secured to the side thereof facing laterally outwardly of said tractor, said beams extending rearwardly of said tractor and providing means for attachment of a plough or like field implement.

References Cited in the file of this patent

UNITED STATES PATENTS

| | | |
|---|---|---|
| 2,237,166 | Schoenrock | Apr. 1, 1941 |
| 2,627,796 | Bunting | Feb. 10, 1953 |
| 2,768,837 | Prater | Oct. 30, 1956 |
| 2,779,606 | Weitzel | Jan. 29, 1957 |
| 2,923,364 | King et al. | Feb. 2, 1960 |

FOREIGN PATENTS

| | | |
|---|---|---|
| 21,763 | Denmark | Dec. 27, 1916 |
| 626,393 | France | May 9, 1927 |